(12) United States Patent
Kakihara et al.

(10) Patent No.: US 7,778,941 B2
(45) Date of Patent: Aug. 17, 2010

(54) POSITION RECOGNITION DEVICE AND POSITION RECOGNITION METHOD, AND ACCOUNTING PROCESSOR AND ACCOUNTING PROCESSING METHOD

(75) Inventors: Masaki Kakihara, Toyota (JP); Yasuyuki Aoki, Nagoya (JP)

(73) Assignees: Toyota Jidosha Kabushiki Kaisha, Toyota-shi (JP); Aisin Seiki Kabushiki Kaisha, Kariya-shi (JP)

( * ) Notice: Subject to any disclaimer, the term of this patent is extended or adjusted under 35 U.S.C. 154(b) by 1860 days.

(21) Appl. No.: 10/363,738

(22) PCT Filed: Aug. 10, 2001

(86) PCT No.: PCT/JP01/06930
§ 371 (c)(1),
(2), (4) Date: Mar. 24, 2003

(87) PCT Pub. No.: WO02/29728

PCT Pub. Date: Apr. 11, 2002

(65) Prior Publication Data
US 2003/0158799 A1    Aug. 21, 2003

(30) Foreign Application Priority Data
Sep. 29, 2000    (JP)    ............... 2000-300034

(51) Int. Cl.
G07B 15/02    (2006.01)
G07B 17/00    (2006.01)
(52) U.S. Cl. ............................ 705/417; 705/30; 705/29
(58) Field of Classification Search ......... 701/200–217; 340/990, 990.25, 99.255; 705/417, 418, 705/30, 29, 7, 1
See application file for complete search history.

(56) References Cited
U.S. PATENT DOCUMENTS
5,563,608 A    10/1996    Tachita et al.
(Continued)

FOREIGN PATENT DOCUMENTS
EP    1 050 853 A1    11/2000
(Continued)

OTHER PUBLICATIONS
U.S. Appl. No. 09/600,779, filed Jul. 21, 2000.
U.S. Appl. No. 09/819,827, filed Mar. 29, 2001.

Primary Examiner—Igor Borissov
(74) Attorney, Agent, or Firm—Oliff & Berridge, PLC

(57) ABSTRACT

A position recognition device for deciding a zone where a moving object takes a position. The device comprises: a travel distance decider for deciding whether or not the moving object has traveled a predetermined distance corresponding to the detection error of the position of the moving object; and a zone decider for deciding the zone where the moving object takes a position, if the travel distance decider decides that the moving object has traveled the predetermined distance.

According to the invention, therefore, "the decision of the zone where the moving object exists" is not made, in case the position of the moving object cannot be precisely detected. Therefore, the precision in the decision of the zone where the moving object exists is improved, and it is unnecessary to set a buffer zone that "the decision of the zone where the moving object exists is not made if the moving object takes a position in the neighborhood" as the reference for deciding the existing zone of the moving object. Without the necessity for setting the buffer zone, therefore, it is possible to reduce the quantities of data and operations and to suppress the rise in the cost for manufacturing the position recognition device. Within the travel distance for a possible error in the detection of the position of the moving object, moreover, it is unnecessary to detect the position of the moving object. Therefore, it is sufficient to acquire discrete pieces of positional information so as to be the position recognition device. It is, therefore, possible to promote the reduction in the size of the position recognition device and to suppress the rise in the cost for manufacturing the position recognition device.

11 Claims, 11 Drawing Sheets

U.S. PATENT DOCUMENTS

| | | | | |
|---|---|---|---|---|
| 5,694,322 | A | * 12/1997 | Westerlage et al. | 705/417 |
| 5,745,868 | A | 4/1998 | Geier | |
| 5,970,481 | A | * 10/1999 | Westerlage et al. | 705/417 |
| 6,002,981 | A | * 12/1999 | Kreft | 701/210 |
| 6,024,655 | A | * 2/2000 | Coffee | 473/407 |
| 6,073,062 | A | * 6/2000 | Hoshino et al. | 701/3 |
| 6,192,314 | B1 | * 2/2001 | Khavakh et al. | 701/209 |

FOREIGN PATENT DOCUMENTS

| | | |
|---|---|---|
| EP | 1 120 749 A1 | 8/2001 |
| JP | A 05-209756 | 8/1993 |
| JP | A-6-231390 | 8/1994 |
| JP | U 6-086023 | 12/1994 |
| JP | A 07-311045 | 11/1995 |
| JP | A 8-96181 | 4/1996 |
| JP | A-8-185550 | 7/1996 |
| JP | A 08-201083 | 8/1996 |
| JP | 408285624 A * | 11/1996 |
| JP | A 8-304095 | 11/1996 |
| JP | 09-134997 | 5/1997 |
| JP | A-9-212794 | 8/1997 |
| JP | A 09-240429 | 9/1997 |
| JP | A-11-509347 | 8/1999 |
| JP | A 2000-076597 | 3/2000 |
| JP | A 2000-113258 | 4/2000 |
| JP | A 2000-123213 | 4/2000 |
| WO | WO 97/04421 | 2/1997 |
| WO | WO98/37468 | 8/1998 |
| WO | WO 0022579 | 4/2000 |

* cited by examiner

POSITION RECOGNITION DEVICE AND POSITION RECOGNITION METHOD, AND ACCOUNTING PROCESSOR AND ACCOUNTING PROCESSING METHOD

TECHNICAL FIELD

The present invention relates to a position recognition device for deciding a zone where a moving object takes a position and, more particularly, to a position recognition device to be used, i.e., in case accounting information is generated as the moving object moves.

BACKGROUND ART

Generally in case a vehicle as the moving object passes through a toll road, there is made the so-called "accounting process", in which the vehicle is charged with a toll according to its type or covered distance. In this accounting processing case, facilities such as gates or tollbooths were conventionally provided at the entrances and exits of the toll road. If the method of providing such facilities is adopted, however, there arise problems that the works to dispose or transfer the facilities themselves are troublesome, and that the landscapes and spectacles around the road are deteriorated by the facilities. Thus, there has been known a device, which can make the aforementioned accounting process without disposing the aforementioned facilities on the road. One example of the device is described in Japanese Patent Laid-Open No. 2000-123213.

This accounting processor described in the Laid-Open is provided with a on-vehicle unit mounted on a vehicle, and an external information unit disposed outside of the vehicle. The on-vehicle unit constructs a portion of the so-called "navigation system" and is provided with an electronic control unit. Moreover, this electronic control unit is constructed of a microcomputer, which is composed mainly of a processor, a storage unit and an input/output interface. With the electronic control unit, there are connected a map database, an input unit, a GPS (i.e., the capitals of Global Positioning System) antenna, and a ground communication unit. This map database is stored with the information on the roads of the map, the information on the accounting zones in the roads and so on. On the other hand, the display unit is provided for operations to input the present position and the destination of the vehicle, or the travel route of the vehicle. Moreover, the display unit indicates the present position of the vehicle in the map data. Moreover, the GPS antenna is provided for receiving signals transmitted from artificial satellites. Still moreover, the ground communication unit is provided for communicating with an integrated center placed on the ground.

The external information unit is constructed to include the artificial satellites and the integrated center. This integrated center is provided with a ground communication unit for communicating with the ground communication unit of the on-vehicle unit, a map database stored with map data determining the accounted zones and the tolls, and an electronic control unit connected with the ground communication unit and the map database.

In the accounting processor described in the aforementioned Laid-Open, the position of the vehicle in the map data is detected by receiving the signals transmitted from the artificial satellites through the GPS antenna of the on-vehicle unit and by processing the received signals. On the basis of the detection result of the position of the vehicle, moreover, it is decided whether the vehicle is positioned in the accounting zone or in the unaccounting zone. Moreover, the position information of the vehicle is transmitted through the ground communication unit of the on-vehicle device to the integrated center. On the basis of the received position of the vehicle, the integrated center makes an accounting process based on the accounting zone and transmits the process result to the on-vehicle unit.

Here in the detection of the position of the vehicle by the artificial satellites and the GPS antenna, a detection error is inevitably caused by the arrayed state of the artificial satellites. Thus, there arises a problem that an erroneous accounting is generated by collating the detection result containing an error and the accounted zone of the map data. In the accounting processor described in the Laid-Open, therefore, a buffer zone is set between an accounted zone and an unaccounted zone of the map data. This buffer zone is set on the basis of a distance corresponding to the detection error of the position of the vehicle. Moreover, the accounting processor is constructed such that the decision that "the vehicle exists in the accounting zone" is not made in case it is decided that the position of the vehicle is in the buffer zone. By thus setting the buffer zone, an erroneous decision on which of the accounting zone or the unaccounting zone the vehicle takes a position is prevented from being made on the basis of the position detecting precision of the vehicle.

In the accounting device described in the aforementioned Laid-Open, however, the error of the position detection of the vehicle is coped with setting the buffer zone between the accounting zone and the unaccounting zone. Therefore, the quantity of data necessary for the accounting process increases, and the operations necessary for the accounting process are complicated. As a result, problems are that the cost for the accounting device rises, and that the time period for processing the data necessary for the accounting becomes long.

A main object of the invention is to provide a position recognition device, a position recognition method, and an accounting processor and an accounting processing method, which can decide it highly precisely whether or not a moving object has moved from a predetermined zone to another, which can suppress the rise in the manufacture cost, and which can prevent the time period necessary for the data processing from becoming long.

DISCLOSURE OF THE INVENTION

In order to achieve the aforementioned object, according to the invention, there is provided a position recognition device for deciding a zone where a moving object takes a position, characterized by comprising: a traveled distance decider for deciding whether or not said moving object has traveled a predetermined distance corresponding to the detection error of the position of said moving object; and a zone decider for deciding the zone where said moving object takes a position, if said traveled distance decider decides that said moving object has traveled said predetermined distance.

According to the invention, therefore, "the decision on what zone the moving object exists in" is not made, within the traveled distance in which the position detection of the moving object possibly be erroneous. Therefore, the precision in the decision on what zone the moving object exists in is improved, and it is unnecessary to set the buffer zone that "the decision on what zone the moving object exists in is not made in case the moving object is detected as taking its position in the neighborhood" as the reference for deciding the existing zone of the moving object. Without the necessity for the buffer zone to be set, therefore, it is possible to reduce the quantities of data and operations and to suppress the rise in the cost for manufacturing the position recognition device. Within the travel distance for a possible error in the detection of the position of the moving object, moreover, it is unnecessary to detect the position of the moving object. Therefore, it is sufficient to acquire discrete pieces of positional information so as to be the position recognition device. It is, therefore, possible to promote the reduction in the size of the position recognition device and to suppress the rise in the cost for manufacturing the position recognition device.

In the device of the invention, moreover, said traveled distance decider and said zone decider may be mounted on said moving object.

In the position recognition device of the invention, therefore, "the moving object can decide the zone where the moving object exists, by receiving neither information nor data from the outside thereof". According to the invention, moreover, there is provided an accounting processor for deciding a zone where a moving object takes a position, thereby to generate accounting information on the basis of the decision result, characterized by comprising: a traveled distance decider for deciding whether or not said moving object has covered a predetermined distance affecting the precision in said accounting information; and an accounting information generator for deciding the zone where said moving object takes a position, if said travel distance decider decides that said moving object has traveled said predetermined distance, and for generating accounting information based on the decision result.

According to the invention, therefore, the zone where the moving object exists is not decided within the travel distance affecting the precision of the accounting information. Therefore, it is unnecessary to set the aforementioned buffer zone as the reference for deciding the existing zone of the moving object, so that the precision for deciding what zone the moving object exists in can be improved. Moreover, the zone in which the moving object exists is not decided within the travel distance, at which the precision of the accounting information is affected by the movement of the moving object. Therefore, the positions of the moving object need not be detected one by one so that a device for acquiring discrete pieces of positional information can be used as the device for detecting the position of the moving object. As a result, it is possible to promote the size reduction of the accounting processor and to suppress the rise in the cost for manufacturing the accounting processor.

In the device of the invention, moreover, said travel distance decider may be constructed to decide said predetermined distance in terms of a rectilinear distance.

According to the device of the invention, therefore, the predetermined distance is decided in terms of the rectilinear distance so that the distance traveled by the moving object is no more than the actual covered distance. Therefore, it is possible to avoid the possibility of occurrence of the excessive accounting.

In the device of the invention, moreover, said accounting information generator may be constructed to compare a travel locus, which is detected by the time said moving object has traveled the predetermined distance, and choices of travel routes existing in the map information providing the reference for deciding the position of said moving object, thereby to decide that said moving object has traveled such one of the choice covered routes existing in said map information as to minimize the travel distance of the moving object.

According to the device of the invention, therefore, it is decided that the moving object has traveled such one of the choice of travel routes existing in the map information as to minimize the travel distance of the moving object. In other words, "the travel distance of the moving object" decided by the accounting information generator is no more than the actual travel distance so that the excessive accounting cannot occur. Moreover, the detection result of the travel locus of the moving object and the choices of the travel route existing in the map information are compared to improve the decision precision of the zone where the moving object exists.

In the device of the invention, moreover, said accounting information generator may be constructed to compare a travel locus, which is detected by the time said moving object has traveled the predetermined distance, and the configurations of choices of travel routes existing in the map information providing the reference for deciding the position of said moving object, thereby to decide what of the choices existing in said map information said moving object has traveled, on the basis of said comparison result.

According to the device of the invention, therefore, it is decided that the moving object has traveled such one of the choice of travel routes existing in the map information as has a configuration similar to the travel locus detected. Therefore, the travel route of the moving object and the actual travel route can be brought close to each other thereby to reduce the possibility of occurrence of the excessive accounting. Moreover, the travel locus of the moving object and the travel route of the map information are collated to improve the decision precision of the zone where the moving object exists.

In the device of the invention, moreover, said accounting information generator may be constructed to decide that said moving object has traveled the travel route which minimizes the accounting resulting from the movement of said moving object.

According to the device of the invention, therefore, it is decided that the moving object has traveled the travel route which minimizes the accounting resulting from the movement of the moving object, thereby to reduce the possibility of occurrence of the excessive accounting furthermore.

In the device of the invention, moreover, said accounting information generator may be constructed not to perform the accounting resulting from the movement of said moving object, if said travel distance decider decides that the travel distance of said moving object is no more than the predetermined distance.

According to the device of the invention, therefore, in case it is decided that the moving object has not traveled the predetermined distance from the reference position, the accounting resulting from the movement of the moving object is not made so that the erroneous accounting can be prevented from occurring.

In the device of the invention, moreover, said travel distance decider and said accounting information generator may be mounted on said moving object.

According to the device of the invention, therefore, the moving object can make the accounting by using not a device disposed its outside but the travel distance decider and the accounting information generator mounted thereon.

According to the invention, moreover, there is provided a position recognition device for deciding a zone where a moving object takes a position, characterized by comprising a controller for executing: a control to decide whether or not said moving object has traveled a predetermined distance corresponding to the detection error of the position of said moving object; and a control to decide the zone where said moving object takes a position, if the moving object is decided as has traveled said predetermined distance.

According to the invention, therefore, "the decision on what zone the moving object exists in" is not made, within the travel range in which the position detection of the moving object possibly be erroneous. Therefore, the precision in the decision on what zone the moving object exists in is improved, and it is unnecessary to set the buffer zone that "the decision on what zone the moving object exists in is not made in case the moving object takes a position in the neighborhood" as the reference for deciding the existing zone of the moving object. Without the necessity for the buffer zone, therefore, it is possible to reduce the quantities of data and operations and to suppress the rise in the cost for manufacturing the position recognition device. Within the travel distance for a probable error in the detection of the position of the moving object, moreover, it is unnecessary to detect the position of the moving object. Therefore, it is sufficient to acquire discrete positional information so as to be the position recognition device. It is, therefore, possible to promote the reduction in the size of the position recognition device and to suppress the rise in the cost for manufacturing the position recognition device.

In the device of the invention, moreover, said controller may be mounted on said moving object.

In the position recognition device of the invention, therefore, the moving object can decide the zone where the moving object exists, without using an outside device.

According to the invention, moreover, there is provided an accounting device for deciding a zone where a moving object takes a position, thereby to generate accounting information on the basis of the decision result, characterized by comprising a controller for executing: a control to decide whether or not said moving object has traveled a predetermined distance affecting the precision in said accounting information; and a control to decide the zone where said moving object takes a position, if it is decided that said moving object has traveled said predetermined distance, and to generate accounting information based on the decision result.

According to the invention, therefore, the zone where the moving object exists is not decided in case of the travel distance of the moving object is within the travel distance affecting the precision of the accounting information. Therefore, the precision in the decision on what zone the moving object exists in can be improved without providing the buffer zone between the predetermined zone and another zone for preventing the erroneous accounting. Moreover, the zone in which the moving object exists is not decided within the travel distance, at which the precision of the accounting information is affected by the movement of the moving object. Therefore, the positions of the moving object need not be finely analyzed, and in other words, need not to be detected in real time by the minute so that a device for acquiring discrete pieces of positional information can be used as the device for detecting the position of the moving object. As a result, it is possible to promote the size reduction of the accounting device and to suppress the rise in the cost for manufacturing the accounting device.

In the device of the invention, moreover, said controller may be constructed to decide said predetermined distance in terms of a rectilinear distance.

According to the device of the invention, therefore, the predetermined distance is decided in terms of the rectilinear distance so that the distance traveled by the moving object is no more than the actual travel distance. Therefore, it is possible to avoid the possibility of occurrence of the excessive accounting.

In the device of the invention, moreover, said controller may be constructed to compare a travel locus, which is detected by the time said moving object has traveled the predetermined distance, and choices of travel routes existing in the map information providing the reference for deciding the position of said moving object, thereby to decide that said moving object has traveled such one of the choice of travel routes existing in said map information as to minimize the travel distance of the moving object.

According to the device of the invention, therefore, it is decided that the moving object has traveled such one of the choice of travel routes existing in the map information as to minimize the travel distance of the moving object. In other words, "the travel distance of the moving object" decided by the controller is no more than the actual travel distance so that the possibility of the excessive accounting drops. Moreover, the detection result of the travel locus of the moving object and the choices of the travel route existing in the map information are compared to improve the decision precision of the zone where the moving object exists.

According to the device of the invention, moreover, said controller may be constructed to compare a travel locus, which is detected by the time said moving object has traveled the predetermined distance, and the configurations of choices of travel routes existing in the map information providing the reference for deciding the position of said moving object, thereby to decide what of the choices existing in said map information said moving object has traveled, on the basis of said comparison result.

According to the device of the invention, therefore, it is decided that the moving object has traveled such one of the choice of travel routes existing in the map information as has a configuration similar to the travel locus detected. Therefore, the travel route of the moving object and the actual travel route can be brought close to each other thereby to reduce the possibility of occurrence of the excessive accounting. Moreover, the travel locus of the moving object and the configuration of travel route of the map information are collated to improve the decision precision of the zone where the moving object exists.

According to the device of the invention, moreover, said controller may be constructed to decide that said moving object has traveled the travel route which minimizes the accounting resulting from the movement of said moving object.

According to the device of the invention, therefore, it is decided that the moving object has traveled the travel route which minimizes the accounting resulting from the movement of the moving object, thereby to reduce the possibility of occurrence of the excessive accounting furthermore.

According to the device of the invention, moreover, said controller may be constructed not to perform the accounting process resulting from the movement of said moving object, if it is decided that the travel distance of said moving object is no more than the predetermined distance.

According to the device of the invention, therefore, in case it is decided that the moving object has not traveled the predetermined distance from the reference position, the accounting process resulting from the movement of the moving object is not made so that the erroneous accounting can be prevented from occurring.

According to the device of the invention, moreover, said controller may be mounted on said moving object.

According to the device of the invention, therefore, the moving object can make the accounting process only by the system mounted on the moving object while receiving neither information nor data from the outside of the moving object.

According to the invention, moreover, there is provided a position recognition method for deciding a zone where a moving object takes a position, characterized by comprising: a traveled distance decision step of deciding whether or not said moving object has traveled a predetermined distance corresponding to the detection error of the position of said moving object; and a zone decision step of deciding the zone where said moving object takes a position, if it is decided that said moving object has traveled said predetermined distance.

According to the invention, therefore, the decision on what zone the moving object exists in is not made, within the travel range in which the position detection of the moving object can be erroneous. Therefore, the precision in the decision on what zone the moving object exists in can be improved, and it is unnecessary to provide the so-called "buffer zone" where "the decision on what zone the moving object exists in" is not made, near the boundary of the zones in the reference data for deciding the existing zone of the moving object. Therefore, it is possible to reduce the quantities of data and operations necessary for deciding the existence of the moving object. Within the travel distance for a probable error in the detection of the position of the moving object, moreover, it is unnecessary to detect the position of the moving object.

According to the invention, moreover, there is provided an accounting processing method for deciding a zone where a moving object takes a position, thereby to generate accounting information on the basis of the decision result, characterized by comprising: a travel distance decision step of deciding whether or not said moving object has traveled a predetermined distance affecting the precision in said accounting information; and an accounting information generation step of deciding the zone where said moving object takes a position, if it is decided that said moving object has traveled said predetermined distance, and generating accounting information based on the decision result.

According to the invention, therefore, the zone where the moving object takes a position is not decided within the travel distance which the travel distance of the moving object affects the precision of the accounting information. Therefore, the precision for recognizing what zone the moving object takes a position can be improved without providing the buffer zone for preventing the erroneous accounting, between the predetermined zone and another. Moreover, the zone in which the moving object exists is not decided within the travel distance, at which the precision of the accounting information is affected by the movement of the moving object. Therefore, the position of the moving object need not be detected within the travel distance affecting the precision of the accounting information by the movement of the moving object, but the detection of the position of the moving object may be discretely made.

In the method of the invention, moreover, said predetermined distance decision step may be constructed to decide said predetermined distance in terms of a rectilinear distance.

According to the device of the invention, therefore, the predetermined distance is decided in terms of the rectilinear distance so that the distance traveled by the moving object is no more than the actual travel distance. Therefore, it is possible to avoid the possibility of occurrence of the excessive accounting.

In the method of the invention, moreover, said accounting information generation step may be constructed to compare a travel locus, which is detected by the time said moving object has traveled the predetermined distance, and choices of travel routes existing in the map information providing the reference for deciding the position of said moving object, thereby to decide that said moving object has traveled such one of the choice of travel routes existing in said map information as to minimize the travel distance of the moving object.

According to the device of the invention, therefore, it is decided that the moving object has traveled such one of the choice of travel routes existing in the map information as to minimize the travel distance of the moving object. In other words, "the travel distance of the moving object" decided by the travel distance decision step is no more than the actual travel distance so that the possibility of the excessive accounting drops. Moreover, the detection result of the travel locus of the moving object and the choices of the travel route existing in the map information are compared to improve the decision precision of the zone where the moving object exists.

In the method of the invention, moreover, said accounting information generation step may be constructed to compare a travel locus, which is detected by the time said moving object has traveled the predetermined distance, and the configurations of choices of travel routes existing in the map information providing the reference for deciding the position of said moving object, thereby to decide what of the candidates existing in said map information said moving object has traveled, on the basis of said comparison result.

According to the device of the invention, therefore, it is decided that the moving object has traveled such one of the choice of travel routes existing in the map information as has a shape similar to the travel locus detected. Therefore, the travel route of the moving object and the actual travel route can be brought close to each other thereby to reduce the possibility of occurrence of the excessive accounting. Moreover, the travel locus of the moving object and the configuration of the travel route of the map information are collated to improve the decision precision of the zone where the moving object takes a position.

In the method of the invention, moreover, said accounting information generation step may be constructed to decide that said moving object has traveled the travel route which minimizes the accounting resulting from the movement of said moving object.

According to the device of the invention, therefore, it is decided that the moving object has traveled the travel route that minimizes the accounting resulting from the movement of the moving object, thereby to reduce the possibility of occurrence of the excessive accounting furthermore.

In the method of the invention, moreover, said accounting information generation step may be constructed not to perform the accounting process resulting from the movement of said moving object, if said travel distance decider decides that the travel distance of said moving object is no more than the predetermined distance.

According to the device of the invention, therefore, in case it is decided that the moving object has not traveled the predetermined distance from the reference position, the accounting process resulting from the movement of the moving object is not made so that the erroneous accounting can be prevented from occurring.

According to the invention, there is provided a moving object position recognition device for deciding a zone where a moving object takes a position, characterized by comprising: travel distance decision means for deciding whether or not said moving object has traveled a predetermined distance corresponding to the detection error of the position of said moving object; and zone decision means for deciding the zone where said moving object takes a position, if said travel distance decision means decides that said moving object has traveled said predetermined distance.

According to the device of the invention, therefore, "the decision on what zone the moving object exists in" is not made, within the travel range in which the position detection of the moving object possibly be erroneous. Therefore, the precision in the recognition on what zone the moving object exists in can be improved, and the buffer zone need not be provided between the zones so that the data capacity and the operations can be simplified and reduced to lower the cost for the system. Within the travel distance for a probable error in the detection of the position of the moving object, moreover, it is unnecessary to detect and analyze the position of the moving object finely by minute, and the device for detecting the position of the moving object may acquire the discrete pieces of positional information. It is, therefore, possible to promote the reduction in the size of the device to be mounted on the moving object, and to reduce the cost for mounting the device drastically.

According to the invention, moreover, there is provided a moving object position recognition device for deciding a zone where a moving object takes a position, thereby to generate accounting information on the basis of the decision result, characterized by comprising: travel distance decision means for deciding whether or not said moving object has traveled a predetermined distance affecting the precision in said accounting information; and accounting information generation means for deciding the zone where said moving object takes a position, if said travel distance decision means decides that said moving object has traveled said predetermined distance, and for generating accounting information based on the decision result.

According to the device of the invention, therefore, the precision for recognizing what zone the moving object takes a position can be improved without providing the buffer zone for preventing the erroneous accounting. Therefore, the precision in the decision on what zone the moving object exists in can be improved, and the buffer zone need not be provided so that the data capacity and the operations can be simplified and reduced to lower the cost for the device. Within the travel distance affecting the precision of the accounting information by the movement of the moving object, moreover, it is not decided what zone the moving object exists in. Therefore, it is unnecessary to detect and analyze the position of the moving object finely by the minute, and the device for detecting the position of the moving object may acquire the discrete pieces of positional information thereby to reduce the cost for the device more.

In the device of the invention, moreover, said travel distance decision means is characterized by having a function to decide said predetermined distance in terms of a rectilinear distance.

According to the invention, therefore, the predetermined distance is decided in terms of the rectilinear distance so that the distance traveled by the moving object is no more than the actual travel distance. Therefore, it is possible to avoid the possibility of the excessive accounting.

In the device of the invention, moreover, said accounting information generation means is characterized by having a function to compare a travel locus, which is detected by the time said moving object has traveled the predetermined distance, and choices of travel routes existing in the map information providing the reference for deciding the position of said moving object, thereby to decide that said moving object has traveled such one of the choice of travel routes existing in said map information as to minimize the travel distance of the moving object.

According to the invention therefore, it is decided that the moving object has traveled such one of the choice of travel routes existing in the map information as to minimize the travel distance of the moving object. Therefore, the travel distance of the moving object is no more than the actual travel distance so that the excessive accounting cannot occur. Moreover, the travel route is collated with the map information so that the detection precision of the travel locus of the moving object is improved.

In the device of the invention, moreover, said accounting information generation means is characterized by having a function to compare a travel locus, which is detected by the time said moving object has traveled the predetermined distance, and the configurations of choices of travel routes existing in the map information providing the reference for deciding the position of said moving object, thereby to decide what of the choices existing in said map information said moving object has traveled, on the basis of said comparison result.

According to the invention, therefore, it is decided that the moving object has traveled such one of the choice traveled routes existing in the map information as has a configuration similar to the travel locus detected. Therefore, the travel route of the moving object and the actual travel route can be brought close to each other thereby to reduce the possibility of the excessive accounting. Moreover, the travel locus of the moving object and the travel route of the map information are collated to improve the decision precision of the travel locus of the moving object.

In the device of the invention, moreover, said accounting information generation means is characterized by having a function to decide that said moving object has traveled the travel route which minimizes the accounting resulting from the movement of said moving object.

According to the invention, therefore, it is decided that the moving object has traveled the travel route which minimizes the accounting resulting from the movement of the moving object, thereby to reduce the possibility of occurrence of the excessive accounting.

In the device of the invention, moreover, said accounting information generation means is characterized by having a function not to perform the accounting process resulting from the movement of said moving object, if said travel distance decision means decides that the travel distance of said moving object is no more than the predetermined distance.

According to the invention, therefore, in case it is decided that the moving object has not traveled the predetermined distance from the reference position, the accounting process resulting from the movement of the moving object is not made. As a result, the erroneous accounting can be avoided.

BEST MODE FOR CARRYING OUT THE INVENTION

Figure 2:
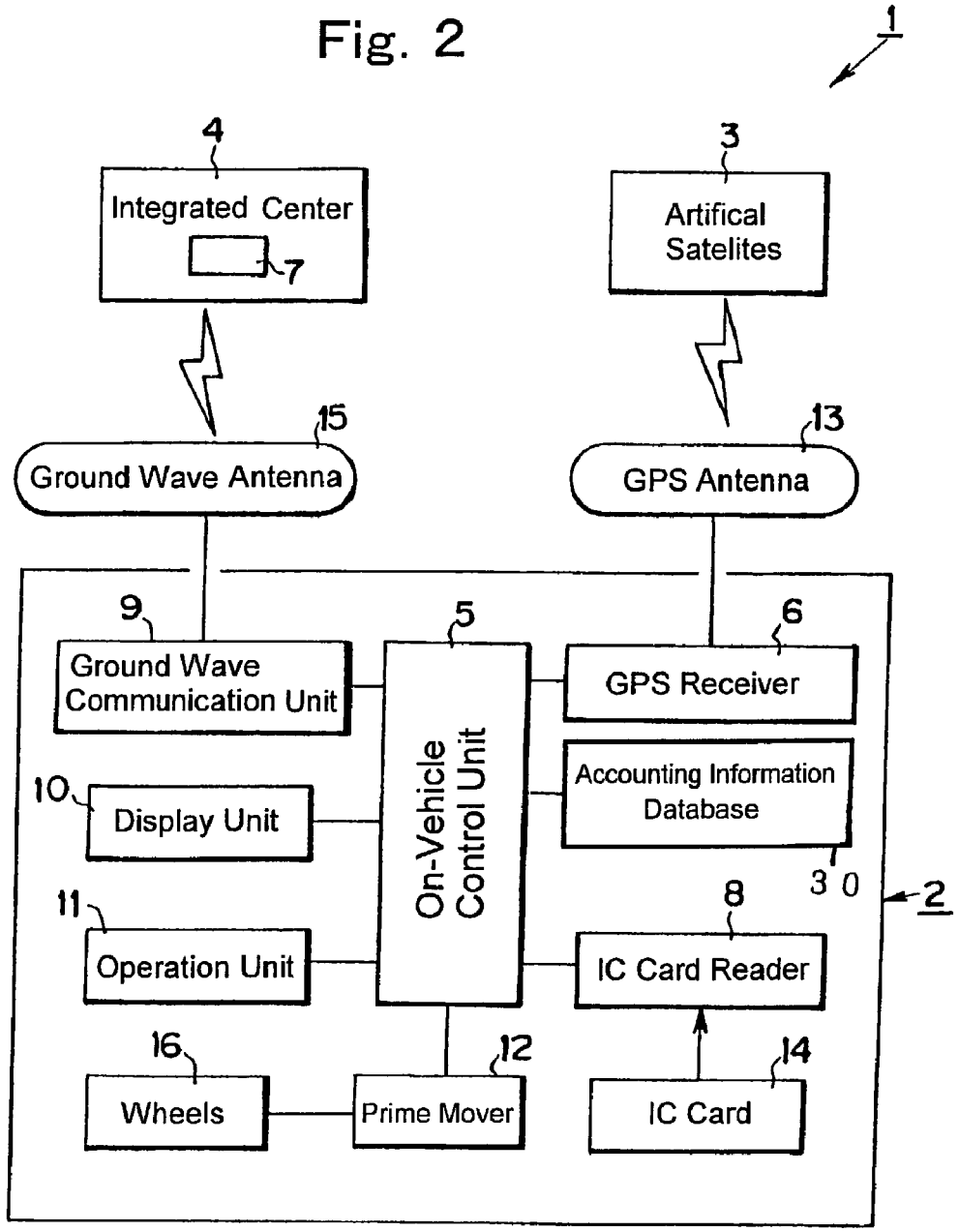
FIG. 2 is a conceptional diagram showing one example of a position recognition device and an accounting processor of the invention.

The invention will be described with reference to the drawings. FIG. 2 is a conceptual diagram showing an automatic accounting system 1, to which the invention is applied. This automatic accounting system 1 is constructed to include: a vehicle 2 for traveling on the earth; a plurality of (e.g., four) artificial satellites 3 for orbiting around the earth; and an integrated center 4 set on the earth. The integrated center 4 is provided with an accounting information database 7 and a (not-shown) communication antenna.

On the vehicle 2, there are mounted a on-vehicle control unit 5, a GPS receiver 6, an accounting information database 30, an IC card reader 8, a ground wave communication unit 9, a display unit 10, an operation unit 11 and a prime mover 12. The on-vehicle control unit 5 controls the various vehicle conditions including the run (or movement) and stop of the vehicle 2. This on-vehicle control unit 5 is constructed of a microcomputer, which is composed mainly of a central processing unit (CPU), a memory unit (RAM and ROM) and an input/output interface. And, mutual communications are made between the on-vehicle control unit 5, and the GPS receiver 6, the accounting information database 30, the IC card reader 8, the ground wave communication unit 9, the display unit 10, the operation unit 11 and the prime mover 12.

To the on-vehicle control unit 5, therefore, there is inputted at least one of the information owned by the accounting information database 7 and the information owned by the accounting information database 30 The information owned by the accounting information database 7 and the information owned by the accounting information database 30 may be identical or different. While the accounting information is being updated, the on-vehicle control unit 5 makes an accounting process on the basis of the latest accounting information. Here will be described the construction other than that of the on-vehicle control unit 5.

A GPS antenna 13 is connected with the aforementioned GPS receiver 6 so that it receives the electric waves transmitted from the artificial satellites 3. The signals received by the GPS antenna 13 are fed through the GPS receiver 6 to the on-vehicle control unit 5. An IC card 14 to be applied to the IC card reader 8 is stored with information such as a toll balance. The ground wave communication unit 9 is provided with a ground wave antenna 15, which make mutual communications with the integrated center 4. The display unit 10 is a device for displaying or outputting the accounting information on the basis of the operation of the operation unit 11. This display unit 10 is exemplified not only by a unit such as a liquid crystal unit or CRT for indicating the information on a display but also by a unit such as a speaker for outputting the information in a voice.

The operation unit 11 is a device, which is operated when the information such as the accounting information is to be called up or when the various kinds of information are to be selected. When the operation unit 11 is operated, the accounting information is outputted from or displayed in the display unit 10. Wheels 16 are connected to the output side of the aforementioned prime mover 12 through a (not-shown) power transmission device so that the vehicle 2 runs when the power (or torque) of the prime mover 12 is transmitted to the wheels 16. Here will be described the corresponding relations between the construction of FIG. 2 and the construction of the invention. The automatic accounting system 1 corresponds to the position recognition device and the accounting processor of the invention; the vehicle 2 corresponds to a moving object of the invention; the on-vehicle control unit 5, the GPS receiver 6, the accounting information databases 7 and 30 and the GPS antenna 13 correspond to a travel distance decider and a zone decider of the invention; and the on-vehicle control unit 5 corresponds to a controller of the invention.

Figure 1:
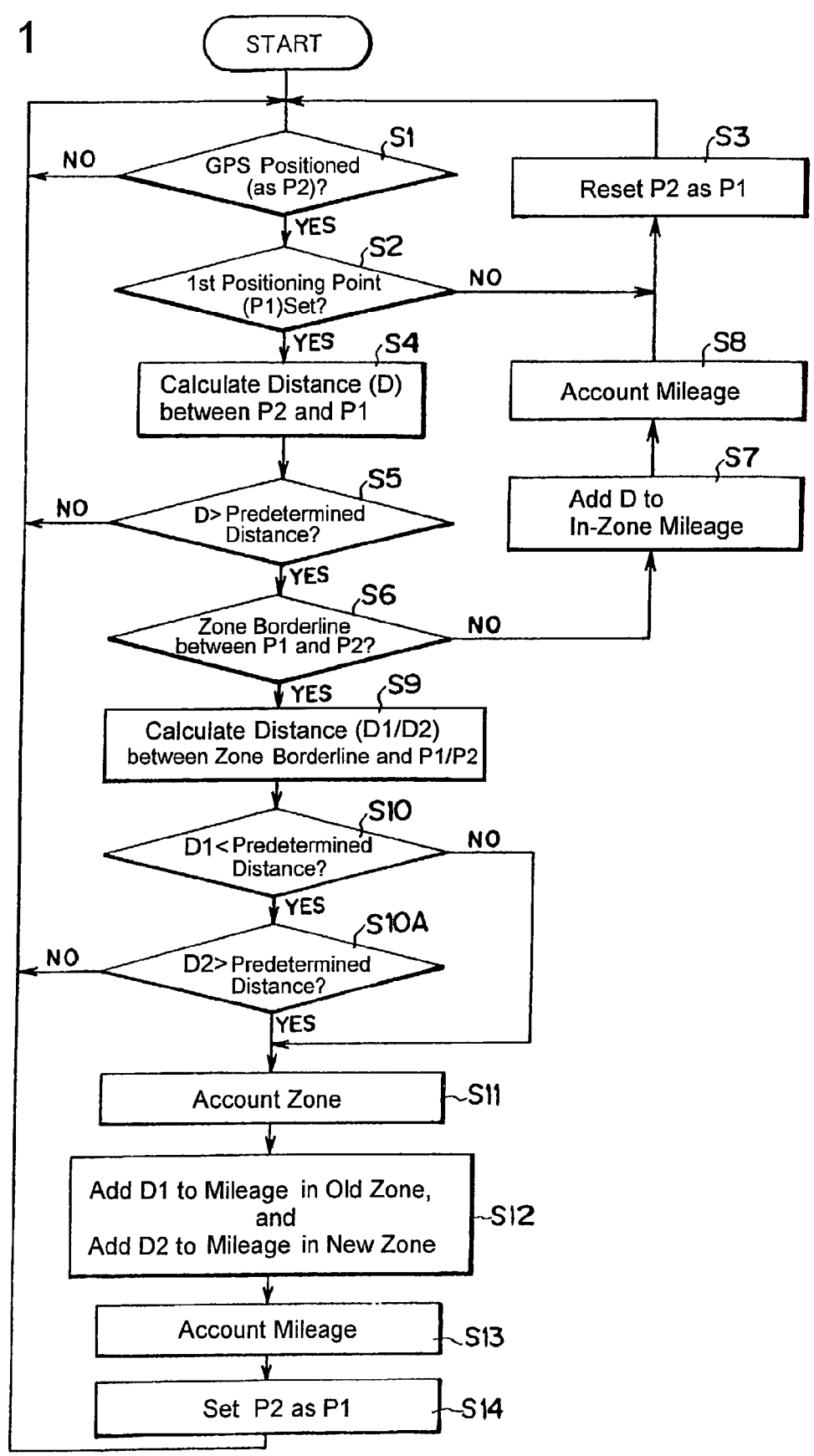
FIG. 1 is a flow chart showing one example of a position recognition method and an accounting processing method of the invention.
Figure 3:
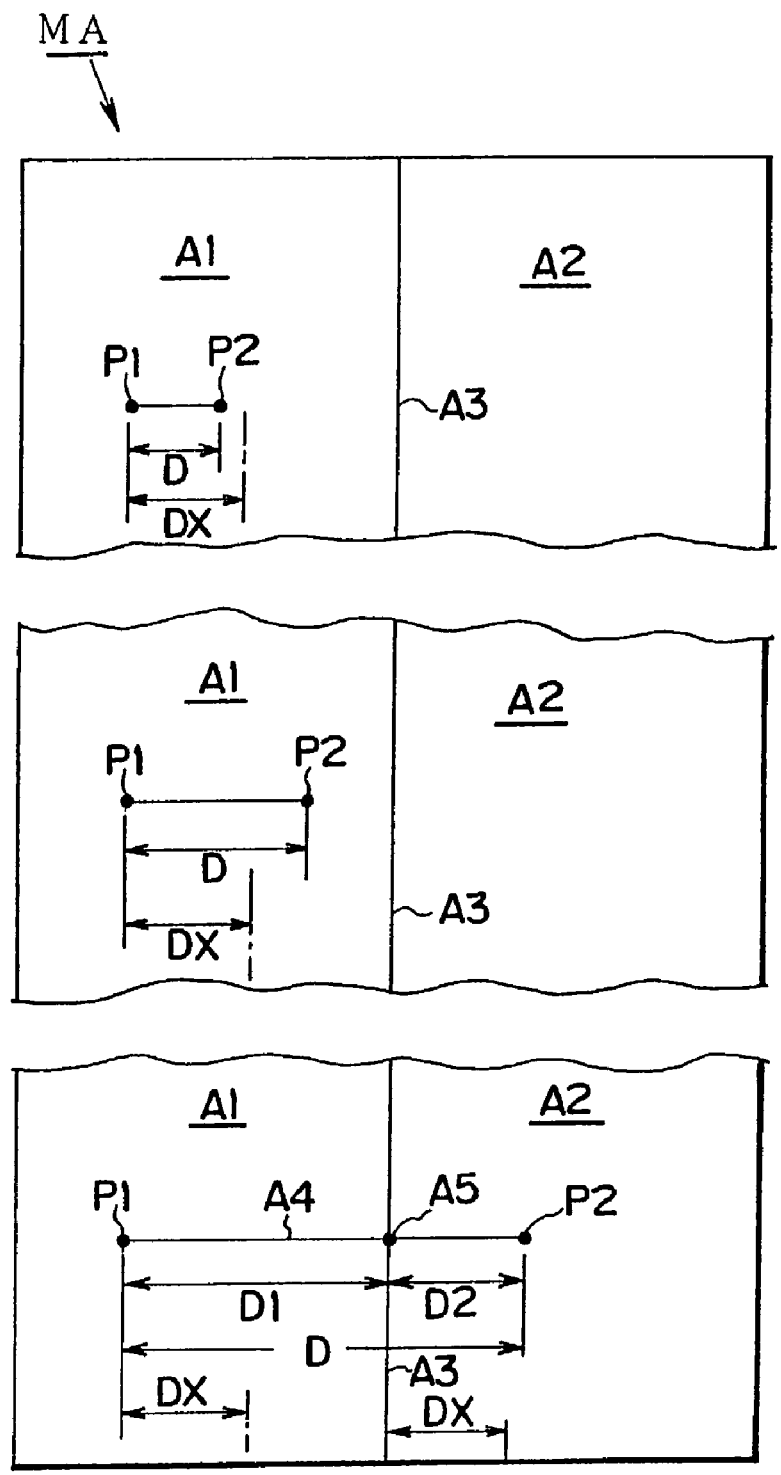
FIG. 3 is an image diagram showing one example of accounting information to be used in the flow chart of FIG. 1.

Next, a control example of the automatic accounting system 1 shown in FIG. 2 will be described with reference to FIG. 1 and FIG. 3. FIG. 1 shows a flow chart, and FIG. 3 shows an accounting zone map MA. This accounting zone map MA is a portion of the accounting information owned by the accounting information databases 7 and 30. In FIG. 3, an accounting zone A1 and an accounting zone A2 are defined by a zone borderline A3.

First of all, when the vehicle 2 exists in the accounting zone A1 of FIG. 3, it is decided (at Step S1) whether or not a positioning has been made using the GPS. The positioning using the GPS means that "the position (or positioning point) of the vehicle 2 is decided by receiving the signals of the artificial satellites 3 through the GPS antenna 13 and by processing the received signals in the on-vehicle control unit 5". If the answer of Step S1 is NO, the routine is returned. If the answer of Step S1 is YES, on the contrary, the positioning point detected at Step S1 is set as a positioning point P2. Next, it is decided (at Step S2) whether or not a positioning point P1 has already been set before the positioning point P2 is set.

If the answer of Step S2 is NO, the positioning point P2 is reset as the positioning point P1 (at Step S3), and the routine is returned. If the answer of Step S2 is YES, there is determined (at Step S4) a rectilinear distance D between the positioning point P1 and the positioning point P2. Next, it is decided (at Step S5) whether or not the rectilinear distance D exceeds a predetermined distance DX. Here, the predetermined distance DX is exemplified by either a value equivalent to a positioning precision, as estimated from several conditions of positioning (e.g., the array of the artificial satellites 3) at the GPS positioning time, or a value equivalent to a mileage when the toll is added in proportion as mileages in the accounting zone A1.

If the rectilinear distance D is less than the predetermined distance DX, as shown in the upper column of FIG. 3, the answer of Step S5 is NO, and the routine is returned. If the rectilinear distance D is more than the predetermined distance DX, as shown in the middle or lower column of FIG. 3, the answer of Step S5 is YES, and it is decided (at Step S6) whether or not the zone borderline A3 has existed in the straight route from the positioning point P1 to the positioning point P2.

Here, if the zone borderline A3 does not exist in the straight route from the positioning point P1 to the positioning point P2, as shown in the middle column of FIG. 3, the vehicle 2 is continuously traveling in the accounting zone A1. Therefore, the answer of Step S6 is NO, and the rectilinear distance D is added to the mileage in the accounting zone A1 (at Step S7). Subsequent to this Step S7, the process to charge the toll, that is, the mileage accounting process is done (at Step S8) on the basis of the mileage of the vehicle 2 in the accounting zone A1. After Step S8, the aforementioned positioning point P2 is set as the positioning point P1 (at Step S3), the routine is returned.

On the other hand, if the zone borderline A3 resides in the straight route from the positioning point P1 to the positioning point P2 at the decision of Step S6, as shown in the lower column of FIG. 3, the answer of Step S6 is YES. And: an intersection A5 between a segment A4 joining the positioning point P1 and the positioning point P2 and the zone borderline A3 is determined; the distance D1 between the positioning point P1 and the intersection A5 is determined; and the distance D2 between the positioning point P2 and the intersection A5 is determined (at Step S9).

Subsequent to Step S9, it is decided (at Step S10) whether or not the distance D1 is less than the predetermined distance DX. The predetermined distance DX to be used at Step S10 may be equal to that DX used in the decision of Step S5. If the answer of Step S10 is NO, the positioning point P1 is sufficiently distant from the zone borderline A3, and possibility of occurring an erroneous zone accounting is rather scarcely, so that the accounting process at the accounting zone A1 is executed (at Step S11).

If the answer of Step S10 is YES, on the other hand, the positioning point P is very close to the zone borderline A3. If the precision for deciding the zone where the vehicle 2 exists, therefore, an erroneous accounting may be generated. It is, therefore, necessary to make a precise decision on "which of the accounting zone A1 or A2 the vehicle 2 exists in". It is, therefore, decided (at Step S10A) whether or not the distance D2 exceeds the predetermined distance DX. The predetermined distance DX used at this Step S10A may be equal to that DX used in the decision of Step S5. If the answer of Step S10A is YES, it is apparent that the positioning point P2 exists at a position apart a long distance from the zone borderline A3, i.e., in the accounting zone A2. In this case, concerning zone accounting, possibility of occurring an erroneous zone accounting is rather scarcely, so that the routine advances to Step S11, at which the accounting process at zone A2 is executed.

If the answer of Step S10A is NO, on the contrary, the positioning point P1 and the positioning point P2 are so close to the zone borderline A3 and there is a possibility to decide "which of the accounting zone A1 or A2 the vehicle 2 exists in" inaccurately. Therefore, if the answer of Step S10A is NO, therefore, the routine is returned without any action.

Subsequent to Step S11, the aforementioned distance D1 is added to the mileage in the accounting zone A1, and the aforementioned distance D2 is added to the mileage in the accounting zone A2 (at Step S12). On the basis of the addition results of Step S12, moreover, mileage accounting processes are executed separately for the accounting zone A1 and the accounting zone A2 (at Step S13).

Subsequent to Step S13, the aforementioned positioning point P2 is set as the positioning point P1 in the accounting zone A2 (at Step S14), and the routine is returned. Here in FIG. 1, the mileage accounting processes of Steps S8 and S13 and the zone accounting processes of Step S1 are executed by transmitting/receiving the electric waves between the vehicle 2 and the integrated center 4, and their accounting results are inputted to the IC card 14.

According to the control example of FIG. 1, as has been described hereinbefore, neither "the decision on what accounting zone the vehicle 2 exists in" nor "the zone accounting process based on that decision result" is done within a predetermined distance where the vehicle 2 may possibly make an error in the position detection. Therefore, it is possible to improve the precision in the decision on what accounting zone the vehicle 2 exists in, and to prevent the erroneous accounting from be generated. Moreover, the accounting information data need not be provided in the boundary between the accounting zones with a buffer zone for absorbing the error in the position detection of the vehicle 2. It is further possible to reduce the amount of data necessary for the accounting process and the amount of the operation. It is, therefore, possible to reduce the size of the automatic accounting system 1 and to lower the manufacture cost. Moreover, it is possible to speed up the accounting process.

In short, according to the control example of FIG. 1, the zone where the vehicle 2 exists can be decided by the automatic accounting system 1 shown in FIG. 2, that is, a device for acquiring the discrete pieces of positional information. Thus, the device for acquiring the discrete pieces of positional information can be called "the position recognition device" or "the accounting processor" using the radio navigation.

In other words, in the control example of FIG. 1, a second device of a kind different from that of a first device need not make the decision of the zone where the vehicle 2 exists and the accounting process based on the zone where the vehicle 2 has been decided to exist in. This second device is a device for detecting the traveling direction and the mileage of the vehicle on the basis of a device mounted on the vehicle, such as a sensor, e.g., an earth magnetic sensor, a wheel speed sensor or a gyro, thereby to recognize the position of the vehicle and perform the accounting process on the basis of the detection result. This second device can be called "the position recognition device" or "the accounting processor" using the dead-reckoning navigation.

According to the control example of FIG. 1, moreover, it is unnecessary to make the various kinds of controls based on the aforementioned dead-reckoning navigation, such as a control for detecting the position of the vehicle, a control for collating the detected position of the vehicle and electronized map data, or a control for matching the detected vehicle position and the roads of the map data sequentially (i.e., the map matching control). Therefore, it is possible to make simpler the device to be mounted on the vehicle 2 and the operation to execute accounting processes.

Moreover, the travel distance of the vehicle 2 is decided in terms of the rectilinear distance so that the distance traveled by the vehicle 2 is shorter than the actual travel distance. Therefore, it is possible to avoid the possibility of the over-accounting more reliably.

Here will be described the corresponding relations between the construction of this embodiment and the construction of the invention. At first, the control contents having been described with reference to the flow chart of FIG. 1 correspond to the position recognition method and the accounting processing method of the invention. Moreover: Step S1 to Step S5 shown in FIG. 1 correspond to a travel distance decision step of the invention; Step S6 corresponds to a zone decision step of the invention; and Step S6 and Step S9 to Step S14 correspond to an accounting information generation step of the invention. Moreover: Step S1 to Step S5 correspond to travel distance decision means of the invention; Step S6 corresponds to zone decision means of the invention; and Step S6 and Step S9 to Step S14 correspond to accounting information generation means of the invention. Moreover, the accounting zones A1 and A2 shown in FIG. 3 correspond to the zones of the invention.

Next, one example of a subroutine for the control of FIG. 1 to adjust the accounting contents of Step S11 to Step S13 on the basis of the number of zone borderlines existing between the positioning point P1 and the positioning point P2 will be described with reference of the flow chart of FIG. 4 and an accounting image diagram M2 of FIG. 5. The accounting image diagram M2 of FIG. 5 is a portion of the accounting information which is owned by the aforementioned accounting information databases 7 and 30.

Figure 4:
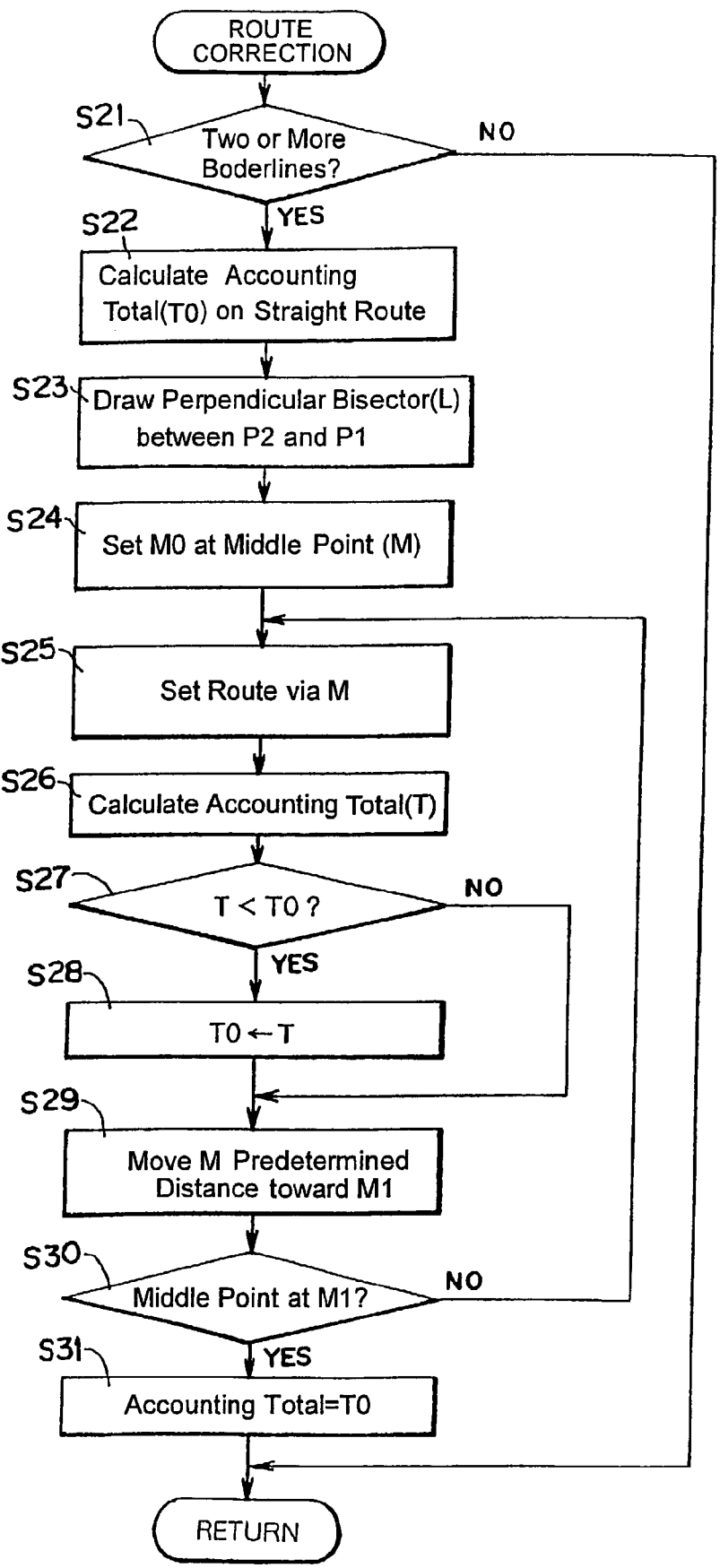
FIG. 4 is a diagram showing one example of a subroutine for correcting an accounting total in the flow chart of FIG. 1.
Figure 5:
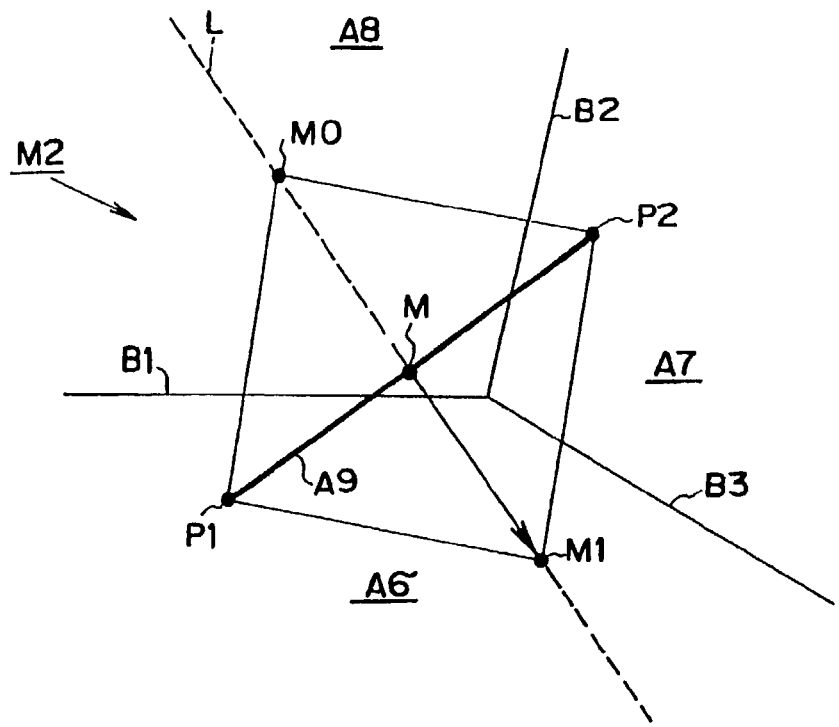
FIG. 5 is a conceptional diagram for explaining a process to calculate the accounting total in the subroutine of FIG. 4.

In the flow chart of FIG. 4, it is decided at first (at Step S21) whether or not two or more zone borderlines have existed between the aforementioned positioning point P1 and positioning point P2. Here for one zone borderline, the zone accounting sum is equal no matter what travel route the vehicle 2 should pass through from a predetermined accounting zone to another. In other words, the zone accounting sum has no changing possibility for every travel routes so that the routine is returned without any action.

If the answer of Step S21 is YES, on the contrary, the accounting total T0 of the case, in which the vehicle 2 has moved straight between the positioning point P1 and the positioning point P2, is determined (at Step S22). In the example of FIG. 5: an accounting zone A6 to an accounting zone A8 are shown; a zone borderline B3 exists between the accounting zone A6 and the accounting zone A7; a zone borderline B2 exists between the accounting zone A7 and the accounting zone A8; and a zone borderline BI exists between the accounting zone A6 and the accounting zone A8. If the vehicle 2 moves straight in FIG. 5 between the positioning point P1 and the positioning point P2, therefore, the total of the zone accounting in the accounting zones A6, A8 and A7 and the mileage accounting in the accounting zones A6, A8 and A7 is the accounting total T0.

Next, there is set (at Step S23) a segment L, which bisects a segment A9 joining the positioning point P1 and the positioning point P2 and which is orthogonal to the segment A9. Moreover, a point MO is set (at Step S24) at a position, which is at a predetermined distance in one direction along the segment L from an intersection M between the segment A9 and the segment L. In the example of FIG. 5, the point MO is set in the accounting zone A8. Next, there is set a travel route (at Step S25), which extends from the positioning point P1 via the point MO to the positioning point P2, and there is calculated (at Step S26) an accounting total T of the case in which the vehicle 2 has passed through the travel route set at Step S25.

Next, it is decided (at Step S27) whether or not the accounting total T is less than the accounting total T0. If the answer of Step S27 is YES, the accounting total T is substituted for the accounting total T0 (at Step S28), and the routine advances to Step S29. If the answer of Step S27 is NO, on the other hand, the routine advances to Step S29 without any action. At Step S29, there is set the (not-shown) middle point, at which the intersection M is moved along the segment L toward a point M1 spaced at a predetermined distance opposite direction of the point MO. Here, the distance between the intersection M and the point MO and the distance between the intersection M and the point M1 are equal.

Moreover, it is decided (at Step S30) whether or not the middle point has arrived at the point M1. If the answer of Step S30 is NO, the routine is returned to Step S25. Like before, more specifically, there are repeated the operations to set the travel route from the positioning point P1 via the middle point to the positioning point P2, to calculate the accounting total T on the travel route, to compare the accounting total T and the accounting total T0, to set the accounting total T0 on the basis of the comparison result, and to move the middle point toward the point M1. Thus, if the answer of Step S30 is YES, the minimum of the accounting totals determined at the foregoing individual steps is fixed as the accounting total T0 (at Step S31), and the routine is returned.

In another process, although not especially shown, a true circle containing the positioning point P1 and the positioning point P2 is set to displace the middle point along the circumference of that true circle, and the accounting totals are calculated for every travel routes from the positioning point P1 via the individual middle points to the positioning point 3, so that the minimum of those accounting totals can be fixed as the accounting total. In still another process, although not especially shown, the individual accounting totals are calculated for all the travel routes of a predetermined range containing the positioning point P1 and the positioning point P2 in the accounting image diagram, so that the minimum of those accounting totals can be fixed as the accounting total. Thus, the control contents having been described with reference with the flow chart shown in FIG. 4 also correspond to the position recognition method and the accounting processing method of the invention. Moreover, Step S21 to Step S31 shown in FIG. 4 correspond to the accounting information generation step of the invention. Moreover, Step S21 to Step S31 correspond to the accounting information generation means of the invention. Moreover: the accounting image diagram M2 of FIG. 5 corresponds the map information of the invention; the accounting zone A6 to the accounting zone A8 shown in FIG. 5 corresponds to the zone of the invention; and the travel route having been described with reference to the flow chart of FIG. 4 corresponds to the travel route of the invention.

Figure 6:
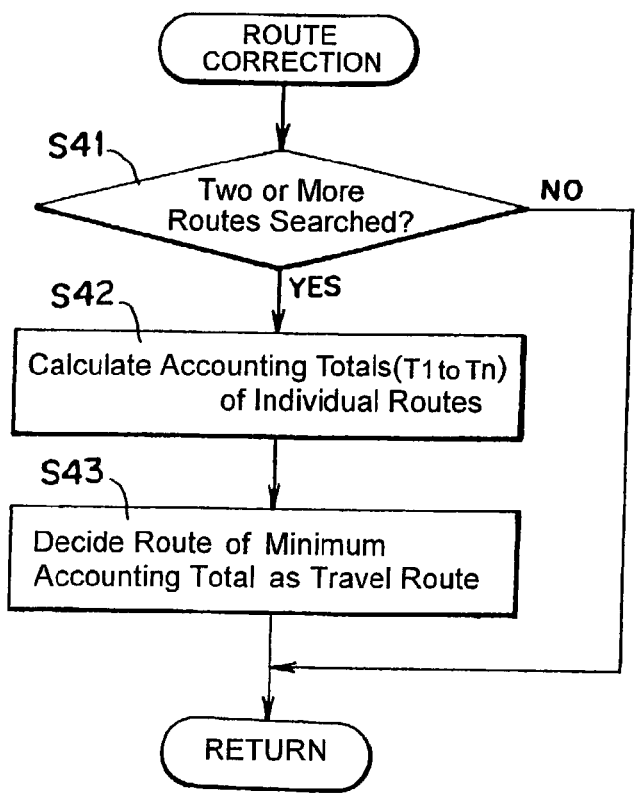
FIG. 6 is a diagram showing another example of the subroutine for correcting the accounting total in the flow chart of FIG. 1.

FIG. 6 is a flow chart showing another example of the subroutine for adjusting the accounting contents of Steps S11 to 13 of FIG. 1. At first in FIG. 6, it is decided (at Step S41) whether or not two or more travel routes have been searched as the route from the positioning point P1 to the positioning point P2. If the answer of Step S41 is NO, the accounting process cannot be made to reduce the accounting total so that the routine is returned.

If the answer of Step S41 is YES, on the contrary, the accounting totals (T1 to Tn) are calculated (at Step S42) individually for all the travel routes which were sought in the accounting image diagram of FIG. 5. It is then decided (at Step S43) that the vehicle 2 has traveled on the travel route which takes the minimum of the accounting totals calculated at Step S42, and the routine is returned. Here will be described the corresponding relations between the control contents shown in FIG. 6 and the construction of the invention. Step S41 to Step S43 correspond to the accounting information generation step. Moreover, Step S41 to Step S43 correspond to the accounting information generation means of the invention. Moreover, the travel route having been described with reference to the flow chart of FIG. 6 corresponds to the travel route of the invention.

Thus for the zone accounting process and the mileage accounting process on the basis of the controls of FIG. 1, the accounting process is done by using the control of FIG. 4 or the control of FIG. 6 while deciding that the vehicle 2 has traveled on such a travel route as has the minimum accounting total, so that the possibility for the erroneous accounting or the excessive accounting can be more reduced advantageously for the user.

Figure 7:
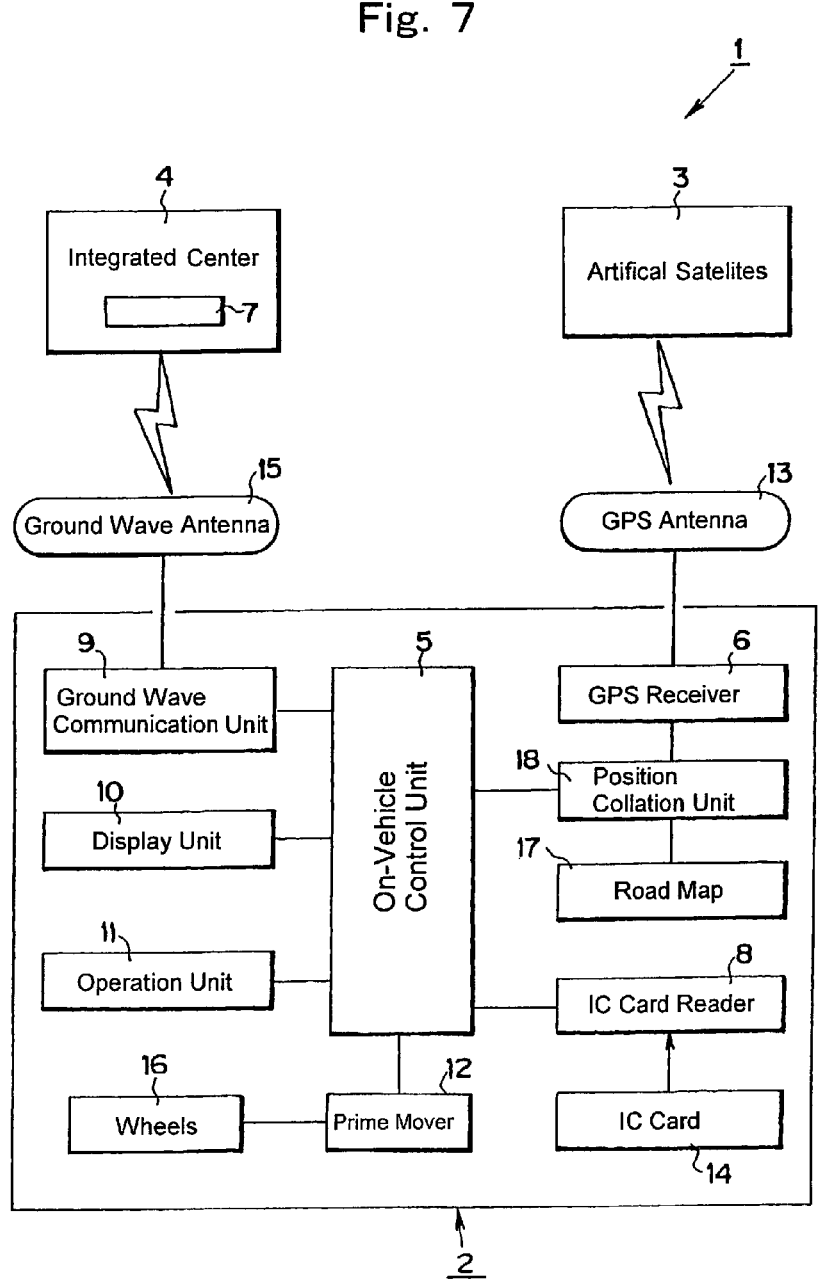
FIG. 7 is a conceptional diagram showing another example of the position recognition device and the accounting processor of the invention.

Next, another construction example of the automatic accounting system 1 will be described with reference to FIG. 7. In FIG. 7, a construction similar to that of FIG. 2 will be omitted on its description by designating it by the common reference numerals. In the position recognition device of FIG. 7, the vehicle 2 is provided with a road map database 17. Moreover, signal communications are made not only between the GPS receiver 6/the road map database 17 and a position collation unit 18 but also between the position collation unit 18 and the on-vehicle control unit 5. This position collation unit 18 is of the well-known type having the (not-shown) storage unit, the (not-shown) comparator and the (not-shown) input/output interface. The road map database 17 includes an information recording medium such as the magnetic disk or the optical disk, which is stored with the digitized road map of the available zone for the vehicle 2 to travel in. Moreover, the position collation unit 18 is provided with a function to collate the positional information of the vehicle based on the signals of the GPS receiver 6 and the road information of the road map database 17.

The aforementioned artificial satellites 3, GPS antenna 13, GPS receiver 6, road map database 17 and position collation unit 18 and so on construct the well-known navigation system. Here will be described the corresponding relations between the construction of FIG. 7 and the construction of the invention. The road map database 17 and the position collation unit 18 correspond to the travel distance decider and the zone decider of the invention. Here, the corresponding relations between the remaining construction of FIG. 7 and the construction of the invention are identical to those between the construction of FIG. 2 and the construction of the invention.

Figure 8:
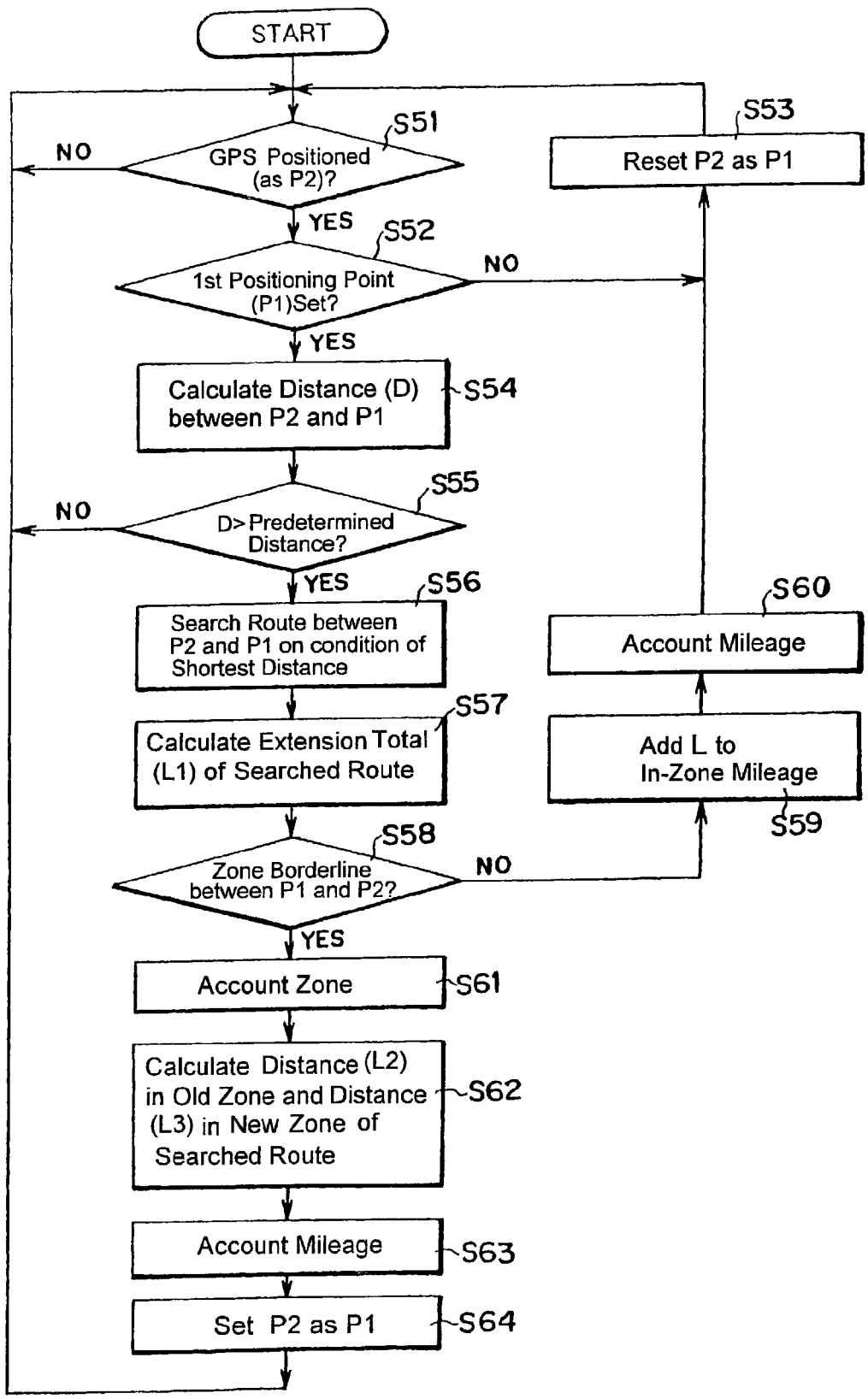
FIG. 8 is a flow chart showing another example of the position recognition method and the accounting processing method of the invention.
Figure 9:
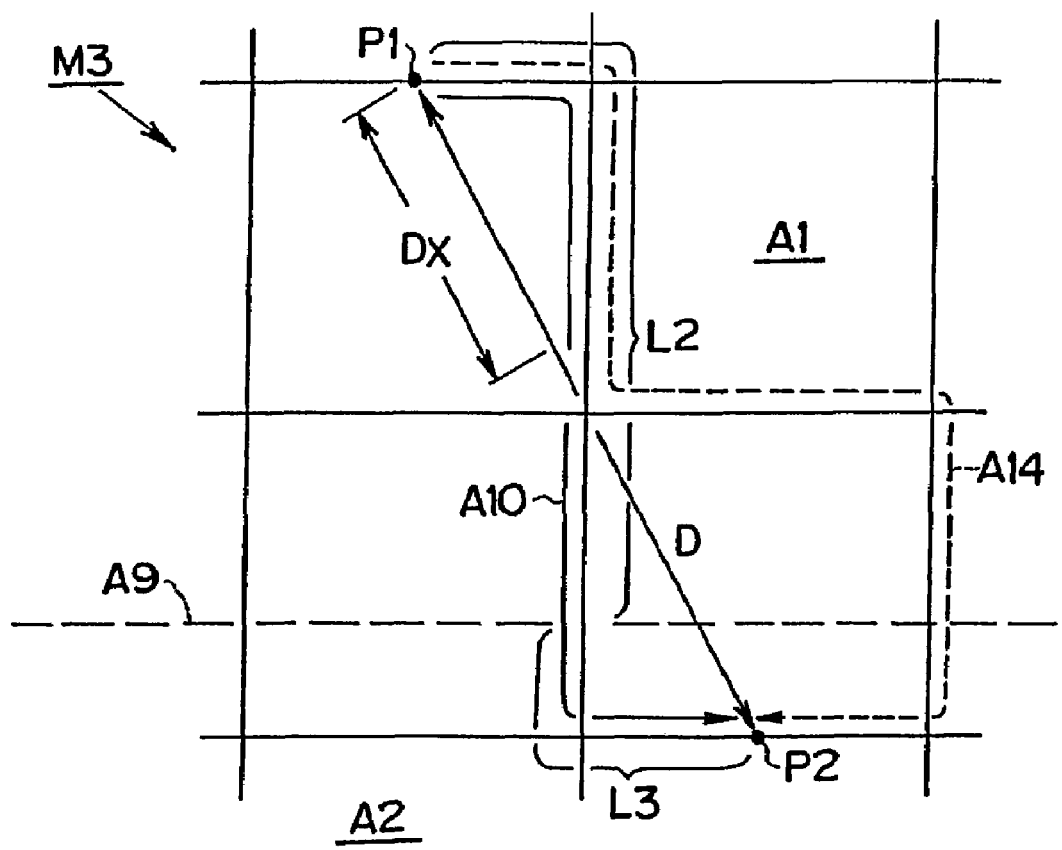
FIG. 9 is an image diagram showing one example of accounting information to be used in the flow chart of FIG. 8.

Next, a control example of the automatic accounting system 1 shown in FIG. 7 will be described with reference to the flow chart of FIG. 8 and a road map M3 of FIG. 9. The road map M3 is stored in the road map database 17 and contains the roads themselves and the accounting information. In FIG. 9, the accounting zone A1 and the accounting zone A2 are defined by the zone borderline A9. The contents of Step S51 of FIG. 8 are identical to those of Step S1 of FIG. 1, and the routine is returned if the answer of Step S51 is NO. If the answer of Step S51 is YES, the routine advances to Step S52. The contents of Step S52 are identical to those of Step S2 of FIG. 1, and the routine is returned through Step S53 if the answer of Step S52 is NO. The contents of Step S53 are identical to those of Step S3 of FIG. 1.

If the answer of Step S52 is YES, the routine advances to Step S54. The contents of Step S54 are identical to those of Step S4 of FIG. 1. The routine advances to Step S55 over Step S54. The contents of Step S55 are identical to those of Step S5 of FIG. 1. If the answer of Step S55 is NO, the routine is returned without any action. If the answer of Step S55 is YES, the road map M3 and a travel locus A14 from the positioning point P1 to the positioning point P2 are collated, and the shortest one A10 of the travel routes from the positioning point P1 to the positioning point P2 is searched (at Step S56) in the road map M3.

Subsequent to Step S56, the extension total (or total length) L1 of the travel route A10 is calculated (at Step S57). Subsequent to Step S57, it is decided (at Step S58) whether or not the zone borderline A9 has existed while the vehicle 2 is moving along the travel route A10 from the positioning point P1 to the positioning point P2. If the answer of Step S58 is NO, the extension total L1 is added to the mileage in the accounting zone A1 (at Step S59). Subsequent to Step S59, the mileage accounting process in the accounting zone A1 is done (at Step S60), and the routine advances to Step S53.

If the answer of Step S58 is YES, on the contrary, the routine advances through Step S61 to Step S62. The contents of Step S61 are identical to those of Step S11 of FIG. 1. At Step S62, of the travel route A10 searched at Step S56, there are calculated (at Step S62) a mileage L2 in the accounting zone A1 and a mileage L3 in the accounting zone A2. Subsequent to Step S62, a mileage accounting process corresponding to the calculation result of Step S62 is done (at Step S63), and the routine is returned through Step S64. The contents of Step S64 are identical to those of Step S14 of FIG. 1.

According to the control example of FIG. 8, as has been described hereinbefore, effects similar to those of the control example of FIG. 1 are obtained for reasons similar to those of the control example of FIG. 1. In the control example of FIG. 8, moreover, the positional information by the navigation system, and the map information and the accounting information of the road map database 17 are collated to search the travel route of the vehicle 2, so that the mileage of the vehicle 2 can be highly precisely detected to improve the precision in the mileage accounting.

Moreover, the control contents of Step S55 of FIG. 8 can be modified into "other control contents". These other control contents mean those for searching such a travel route as to minimize the accounting total of the zone accounting and the mileage accounting from the positioning point P1 to the positioning point P2. When the other control contents are thus used, the sums of accountings to be made at Step S60, Step S61 and Step S63 can be reduced advantageously for the user.

Here will be described the corresponding relations between the functional means shown in FIG. 8 and the construction of the invention. Step S51 to Step S55 correspond to the travel distance decision step of the invention; Step S58 corresponds to the zone decision step; and Step S56, Step S57, and Step S61 to Step S63 correspond to the accounting information generation step of the invention. Moreover: Step S51 to Step S55 correspond to the travel distance decision means of the invention; Step S58 corresponds to the zone decision means of the invention; and Step S56, Step S57, and Step S61 to Step S63 correspond to the accounting information generation means of the invention. Moreover, the travel route having been described with reference to the flow chart of FIG. 8 corresponds to the travel route of the invention. Moreover, the road map M3 shown in FIG. 9 corresponds to the map information of the invention.

Figure 10:
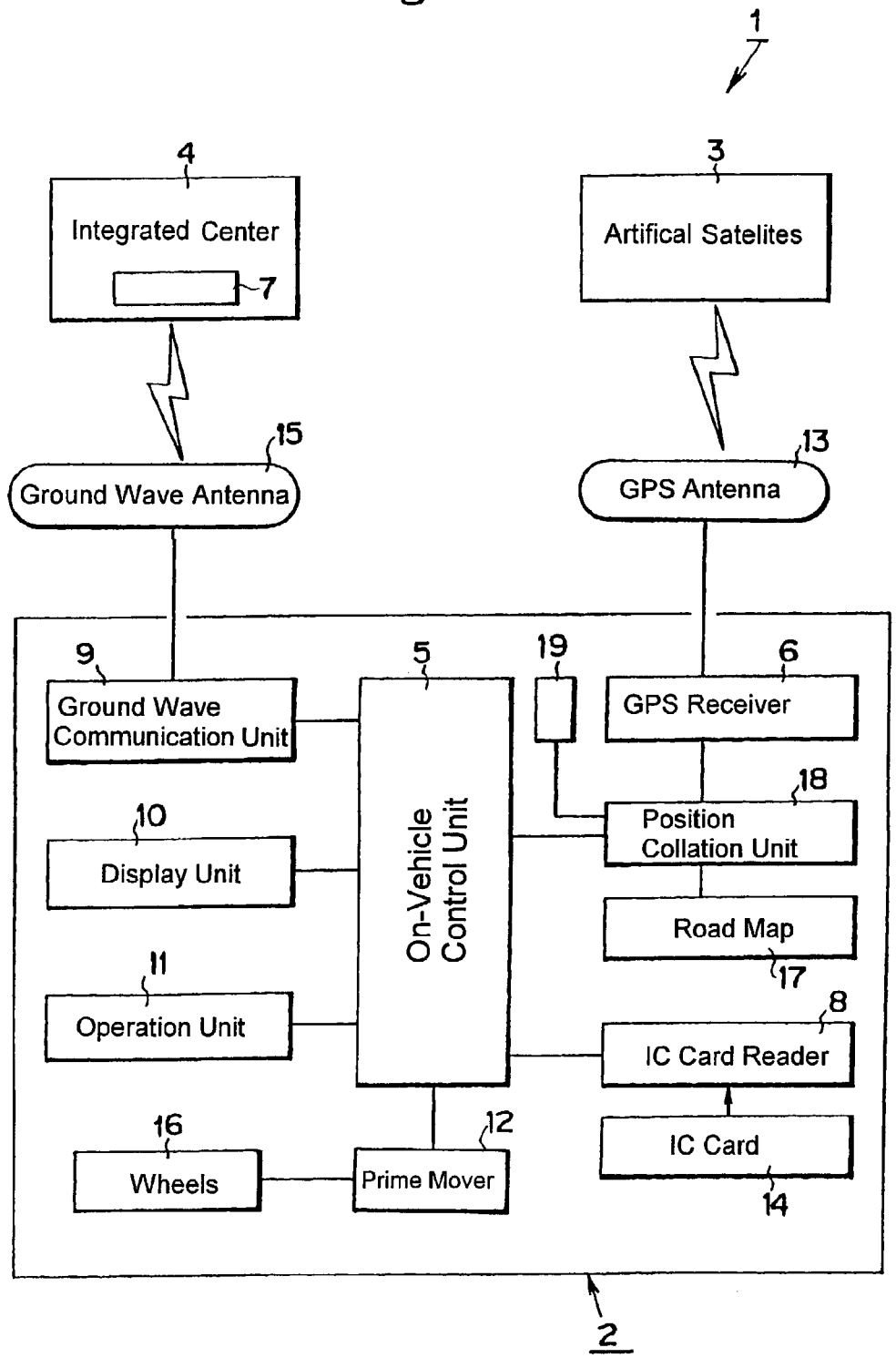
FIG. 10 is a conceptual diagram showing another example of the position recognition device and the accounting device of the invention.

FIG. 10 is a conceptional diagram showing another construction of another automatic accounting system 1 of the invention. In FIG. 10, a construction identical to those of FIG. 2 and FIG. 7 will be omitted on its description by designating it by the same reference numerals as those of FIG. 2 and FIG. 7. In the automatic accounting system 1 of FIG. 10, a dead-reckoning navigation unit 19 is connected in a signal communicating manner with the position collation unit 18. This dead-reckoning navigation unit 19 is constructed of a well-known element such as the gyro compass (not-shown), the earth magnetic sensor (not-shown), the wheel speed sensor (not-shown), the acceleration sensor (not-shown) or the steering angle sensor (not-shown). Specifically, the dead-reckoning navigation unit 19 is provided for detecting signals relating to the traveling direction (or azimuth) and the travel distance (or the mileage) of the vehicle 2 in the horizontal plane on the road map. In the corresponding relations between the construction of FIG. 10 and the invention, the dead-reckoning navigation unit 19 corresponds to a covered distance decider of the invention. The corresponding relations between the remaining construction of FIG. 10 and the construction of the invention are identical to those between the constructions of FIG. 2 and FIG. 7 and the construction of the invention.

Next, a control example by the automatic accounting system 1 shown in FIG. 10 will be described with reference to a flow chart of FIG. 11 and a road map M4 of FIG. 12. The road map M4 of FIG. 12 forms part of the information owned by the road map database 17 and contains the road information and the accounting information. In FIG. 12, the accounting zone A1 and the accounting zone A2 are defined by a zone borderline A11.

Figure 11:
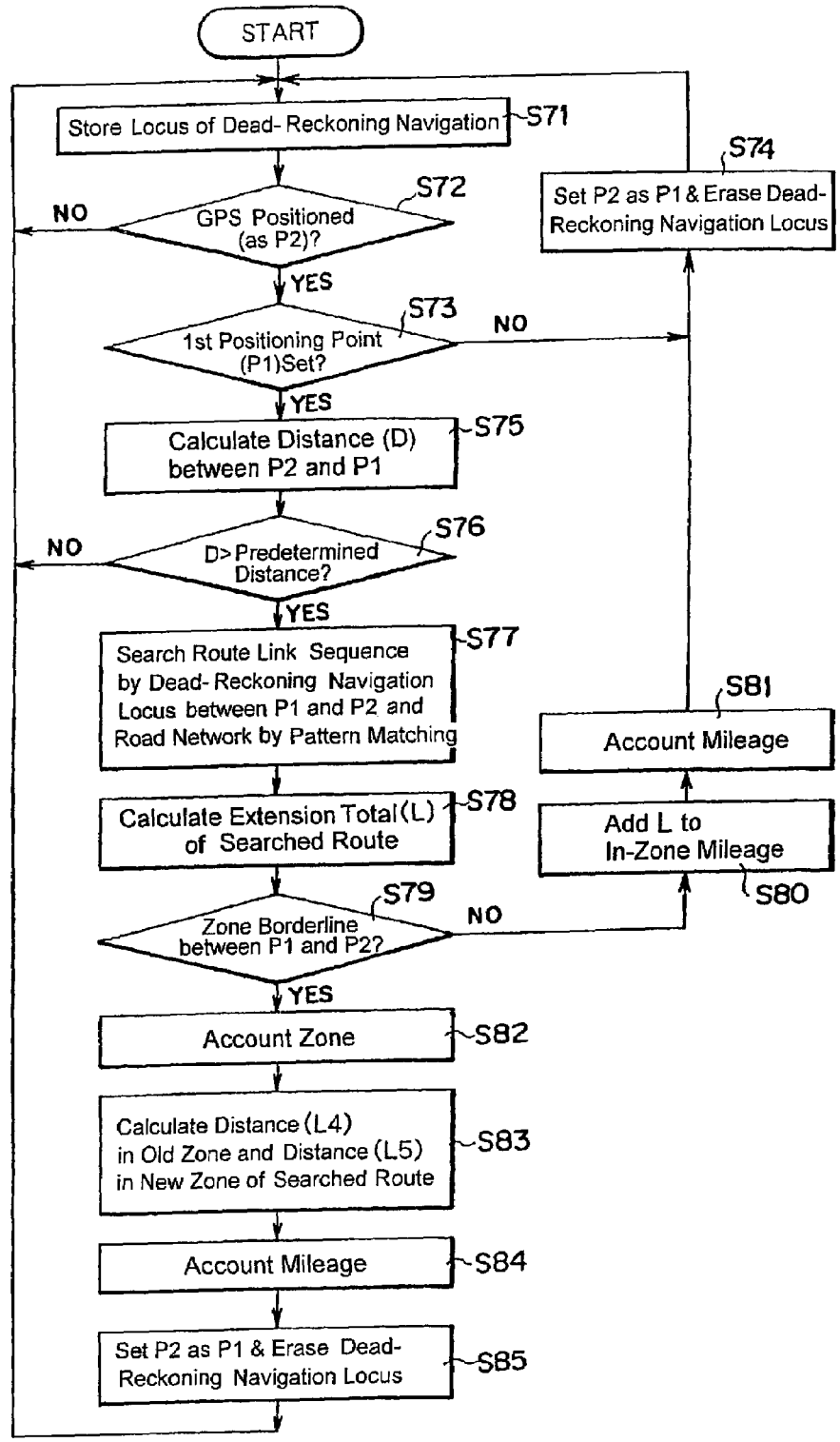
FIG. 11 is a flow chart showing another example of the position recognition method and the accounting processing method of the invention.
Figure 12:
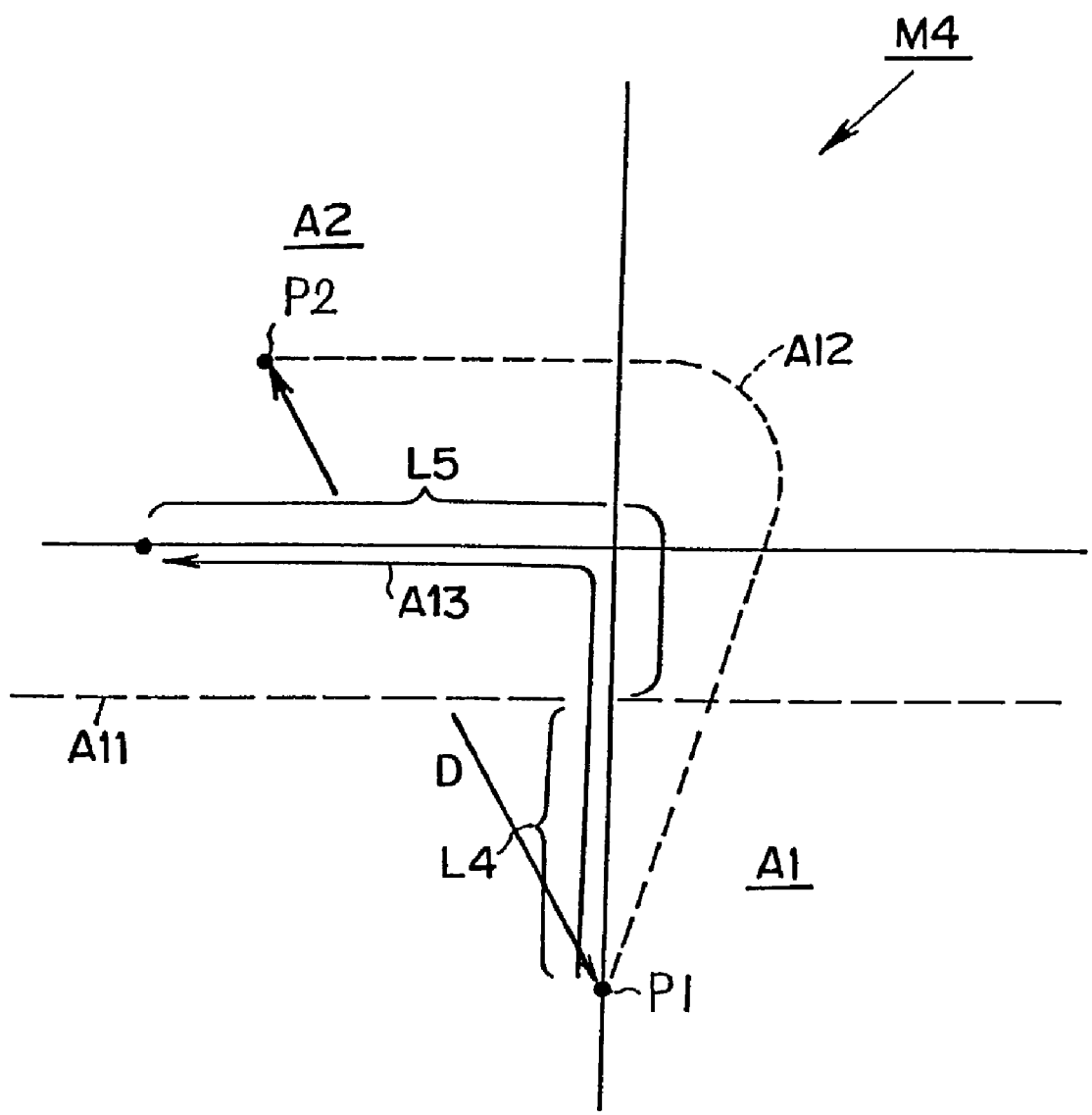
FIG. 12 is an image diagram showing one example of accounting information to be used in the flow chart of FIG. 11.

In the flow chart of FIG. 11, on the basis of the detection signals obtained by the dead-reckoning navigation unit 19, the travel locus of the vehicle 2 is decided and is stored (at Step S71). Subsequent to Step S71, the routine advances to Step S72. The contents of Step S72 are identical to those of Step S1 of FIG. 1, and the routine is returned if the answer of Step S72 is NO. If the answer of Step S72 is YES, the routine advances to Step S73. The contents of Step S73 are identical to those of Step S2 of FIG. 1, and the routine is returned through Step S74 if the answer of Step S73 is NO. At Step S74, the positioning point P2 is set as the positioning point P1, and the travel locus of the vehicle 2 stored at Step S71 is erased.

If the answer of Step S73 is YES, the routine advances to Step S75. The contents of Step S75 are identical to those of Step S4 of FIG. 1. Subsequent to Step S75, the routine advances to Step S76. The contents of Step S76 are identical to those of Step S5 of FIG. 1. If the answer of Step S76 is NO, the routine is returned without any action. If the answer of Step S76 is YES, the travel locus between the positioning point P1 and the positioning point P2 according to the dead-reckoning navigation and the information of the road map database 17 are compared to search the travel locus of the vehicle 2 on the road map (at Step S77).

The contents of Step S77 will be specified in the following. A travel locus A12, which is decided in terms of the pieces of information such as the distance between intersections for the vehicle 2 to turn to the right or left, the turning angle of the traveling direction of the vehicle 2 or the turning radius of the vehicle, is collated with the plane shapes of roads in the road map M4. It is decided that the vehicle 2 has traveled a travel route A13, which is formed of a configuration similar to the travel locus. At Step 77, the configuration of the travel route is decided on the basis of the data digitized from the road information, such as a link sequence or a node sequence. The control for collating the travel locus A12 and the plane configuration of the roads is called "the pattern matching".

Subsequent to Step S77, the extension total (or total length) L1 of the travel route A13 is calculated (at Step S78). Subsequent to Step S78, it is decided (at Step S79) whether or not the zone borderline A11 has existed while the vehicle 2 is moving along the travel route A13 from the positioning point P1 to the positioning point P2. If the answer of Step S79 is NO, the extension total L1 is added (at Step S80) to the mileage in the accounting zone A1. Subsequent to Step S80, the mileage accounting in the accounting zone A1 is made (at Step S81), and the routine advances to Step S74.

If the answer of Step S79 is YES, on the contrary, the routine advances through Step S82 to Step S83. The contents of Step S82 are identical to those of Step S11 of FIG. 1. At Step S83, a mileage L4 in the accounting zone A1 and a mileage L5 in the accounting zone A2 are calculated for the travel route A13 searched at Step S77. Subsequent to Step S83, a mileage accounting corresponding to the calculated result of Step S83 is made (at Step S84), and the routine is returned through Step S86. At Step S85, the positioning point P2 is set as the positioning point P1, and the travel locus of the vehicle 2, as detected by the dead-reckoning navigation unit 19, is erased. In short, it is prepared to detect the travel locus of the vehicle 2 by the dead-reckoning navigation with reference to the new positioning point P1.

According to the control example of FIG. 11, as has been described hereinbefore, effects similar to those of the control example of FIG. 1 are obtained for reasons similar to those of the control example of FIG. 1. In the control example of FIG. 11, moreover, the positional information by the GPS system, and the information of the road map database 17 are collated to search the travel route A13 of the vehicle 2, so that the travel route and the mileage of the vehicle 2 can be highly precisely detected to improve the precision in the zone accounting and in the mileage accounting while eliminating the erroneous accounting and the excessive accounting. Here in case the automatic accounting system 1 of FIG. 9 and the automatic accounting system 1 of FIG. 10 are compared, the automatic accounting system 1 of FIG. 10 raises the cost for the dead-reckoning navigation unit 19, when mounted on the vehicle. However, the accounting can be made by searching the substantially actual travel route so that its fairness is more improved.

In case the control of Step S77 of FIG. 11 has searched a plurality of choices for the travel route, on the other hand, it is also possible to search the travel route that minimizes the accounting total of the zone accounting and the mileage accounting from the positioning point P1 to the positioning point P2. With this construction, the sum of the accountings of Step S81, Step S82 and Step S84 can be reduced advantageously for the user.

The control contents thus far described with reference to the flow chart of FIG. 11 correspond to the position recognition method and the accounting method of the invention. Moreover: Step S71 to Step S76 shown in FIG. 11 correspond to the travel distance decision step of the invention; Step S79 corresponds to the zone decision step of the invention; and Step S77, Step S78 and Step S82 to Step S84 correspond to the accounting information generation step of the invention. Moreover: Step S71 to Step S76 shown in FIG. 11 correspond to the travel distance decision means of the invention; Step S79 corresponds to the zone decision means of the invention; and Step S77, Step S78 and Step S82 to Step S84 correspond to the accounting information generation means of the invention. Moreover, the travel route described in FIG. 11 corresponds to the travel route, and the travel locus corresponds to the travel locus of the invention. Moreover, the road map M4 of FIG. 12 corresponds to the map information of the invention. Here, the aforementioned individual control examples have been described on the case, in which whether or not a zone borderline is set to exist is detected between an accounting zone and an accounting zone. However, it is also possible to make a control to detect whether or not the zone borderline exists between the accounting zones.

In the aforementioned individual control examples, the accounting information may be acquired from either the accounting information database 7 or the accounting information database 30. In the individual control examples, moreover, it is decided whether or not the vehicle has traveled the predetermined distance corresponding to the detection error in the position of the vehicle, as obtained by the radio navigation, so that the zone where the vehicle exists is decided on the basis of that decision result. However, it can also be decided whether or not the vehicle has traveled the predetermined distance corresponding to the detection error in the position of the vehicle, as obtained by the self-contained navigation, thereby to decide the vehicle existing zone on the basis of the decision result. Even in case this construction is adopted, it is possible to reduce the quantity of data and to simplify the operations too without forming any buffer zone in the boundary between the zones.

In the invention, "the moving object" means a movable object, hence it does not matter whether or not "the moving object" moves at all times. In the invention, moreover, the movement of the moving object includes the case, in which the moving object moves by its own kinetic energy or potential energy, and the case in which the moving object moves by an external force applied thereto. In the invention, moreover, "the moving object" is exemplified by a vehicle, a motorbike, a bicycle with a motor, a bicycle, a human being or an animal. In the invention, moreover, the sentence "a system including a covered distance judger, a zone judger, an accounting information generator and a controller is mounted on the moving object" is exemplified by first and second cases. In the first case, the aforementioned system has already been mounted on or attached to the moving object. In the second case, on the other hand, the aforementioned system is not mounted on the moving object yet, but can be mounted on or attached to the moving object. Here in case the moving object is the aforementioned human being or animal, the sentence "the human being or animal holds the system by using an accessory or the like" corresponds to the construction "the system is mounted on the moving object" in the invention.

In the invention, moreover, "the zone" means such a global space, e.g., on the ground, in the air, in the sea or in the ground that the moving object can move therein. In the invention, moreover, "the predetermined distance" means a straight distance in the global space from a reference position (or positioning point) to another position (or positioning point). In the invention, moreover, "the predetermined distance affecting the precision in the accounting information" is exemplified by the distance corresponding to the detection error of the position of the moving object or by the distance, at which the moving object is charged with the toll for each coverage. In the invention, moreover, the terminology "position" is used to mean the "occupied place" or "exist". For example, the phrase "the zone where the moving object takes a position" means "the zone where the moving object exists", and the phrase "the position of the moving object" means "the place occupied by the moving object". From these meanings, "the position recognition device" of the invention can also be expressed by "the existence zone decision device of the moving object" or "the existence zone decision method of the moving object". Moreover, "the position recognition method" can be expressed further by "the existence zone decision device of the moving object" or "the existence zone decision method of the moving object".

INDUSTRIAL APPLICABILITY

The present invention relates to a device and a method for deciding the zone where a moving object exists. If the vehicle, the motorbike or the bicycle with the motor is selected as the moving object, therefore, the invention can be utilized in the industrial field for road managements and for traffic managements. The invention can be utilized especially in the industrial field where "the accounting" is made for charging the toll on the basis of the zone where the moving object exists.

The invention claimed is:
1. An accounting system configured to decide a zone where a moving object takes a position, thereby to generate accounting information on the basis of the decision result, the accounting system comprising:
a controller configured for:
 determining a travel distance of the moving object between a first point and a second point on a travel route of the moving object;
 comparing the determined travel distance to a predetermined distance; and
 determining whether a travel distance of the moving object exceeds the predetermined distance, wherein:
  when the travel distance of the moving object is determined to have exceeded the predetermined distance, the controller is configured to determine an existence of a zone borderline between different accounting zones in the travel route of the moving object;
  when it is determined that the zone borderline exists in the travel route of the moving object, the controller is configured to determine a first distance from the first point to the zone borderline and a second distance from the zone borderline to the second point;
  when the determined first distance exceeds the predetermined distance, the controller is configured to execute an accounting process to generate the accounting information based on the determined first distance;
  when the determined second distance exceeds the predetermined distance, the controller is configured to execute an accounting process to generate the accounting information based on the determined second distance; and
  the controller is configured not to perform the accounting resulting from the movement of the moving object, when the controller decides that the travel distance of the moving object is no more than the predetermined distance; and
a communication unit configured to send the accounting information to an accounting station.

2. An accounting system as set forth in claim 1, wherein the controller is configured to decide the predetermined distance in terms of a rectilinear distance.

3. An accounting system as set forth in claim 1, wherein the controller is configured to compare a travel locus, which is detected by a time the moving object has traveled the predetermined distance, and choices of the travel routes existing in map information providing a reference for deciding the position of the moving object, thereby to decide that the moving object has traveled such one of a choice of travel routes existing in the map information as to minimize the travel distance of the moving object.

4. An accounting system as set forth in claim 1, wherein the controller is configured to compare a travel locus, which is detected by a time the moving object has traveled the predetermined distance, and a configurations of choices of travel routes existing in map information providing a reference for deciding the position of the moving object, thereby to decide what choices existing in the map information the moving object has traveled, on the basis of the comparison result.

5. An accounting system as set forth in claim 1, wherein the controller is configured to decide that the moving object has traveled the travel route which minimizes the accounting resulting from the movement of the moving object.

6. An accounting system as set forth in claim 1, wherein the controller is mounted on the moving object.

7. An accounting processing method for deciding a zone where a moving object takes a position, thereby to generate accounting information on the basis of the decision result, a controller performing the accounting processing method comprising the steps of:
a.) determining a travel distance of the moving object between a first point and a second point on a travel route of the moving object by a controller;
b.) comparing the determined travel distance to a predetermined distance by the controller;
c.) determining whether a travel distance of the moving object exceeds the predetermined distance by the controller;

d.) when the travel distance of the moving object is determined to have exceeded the predetermined distance in step (c), the controller is configured to determine an existence of a zone borderline between different accounting zones in the travel route of the moving object by the controller;

e.) when it is determined that the zone borderline exists in the travel route of the moving object in step (d), the controller is configured to determine a first distance from the first point to the zone borderline and a second distance from the zone borderline to the second point by the controller;

f.) when the determined first distance exceeds the predetermined distance, the controller is configured to execute an accounting process to generate accounting information based on the determined first distance in step (e) by the controller;

g.) when the determined second distance exceeds the predetermined distance, the controller is configured to execute the accounting process to generate accounting information based on the determined second distance in step (e) by the controller; and h.) sending the accounting information to an accounting station by a communication unit, wherein the controller in steps (f) and (g) is configured not to perform the accounting resulting from the movement of the moving object, when step (c) decides that the travel distance of the moving object is no more than the predetermined distance.

8. An accounting processing method as set forth in claim 7, wherein step (b) is configured to decide the predetermined distance in terms of a rectilinear distance.

9. An accounting processing method as set forth in claim 7, wherein steps (f) and (g) are configured to compare a travel locus, which is detected by the time the moving object has traveled the predetermined distance, and choices of travel routes existing in map information providing a reference for deciding the position of the moving object, thereby to decide that the moving object has traveled such one of a choice of travel routes existing in the map information as to minimize the travel distance of the moving object.

10. An accounting processing method as set forth in claim 7, wherein steps (f) and (g) are configured to compare a travel locus, which is detected by a time the moving object has traveled the predetermined distance, and configurations of choices of travel routes existing in a map information providing a reference for deciding the position of the moving object, thereby to decide what choices existing in the map information the moving object has traveled, on the basis of the comparison result.

11. An accounting processing method as set forth in claim 7, wherein steps (f) and (g) are configured to decide that the moving object has traveled the travel route which minimizes the accounting resulting from the movement of the moving object.

* * * * *